United States Patent [19]

Dekker et al.

[11] Patent Number: 5,366,367
[45] Date of Patent: Nov. 22, 1994

[54] COMPACTING APPARATUS

[75] Inventors: Don L. Dekker; Robert R. Hasbrouck, both of Terre Haute, Ind.

[73] Assignee: Koch Materials Company, Witchita, Kans.

[21] Appl. No.: 230,851

[22] Filed: Apr. 21, 1994

Related U.S. Application Data

[63] Continuation of Ser. No. 885,155, May 18, 1992, Pat. No. 5,334,005.

[51] Int. Cl.$^5$ .............................................. B29C 43/00
[52] U.S. Cl. ................................. 425/194; 425/195; 425/328; 425/356; 425/413; 425/453; 425/469
[58] Field of Search ............... 425/188, 189, 193, 194, 425/195, 259, 328, 356, 367, 412, 413, 425, 451, 451.7, 452, 453, 469

[56] References Cited

U.S. PATENT DOCUMENTS

| | | |
|---|---|---|
| 845,674 | 2/1907 | Wincklhofer . |
| 881,513 | 3/1908 | Wengs . |
| 991,412 | 5/1911 | Baade . |
| 1,632,317 | 6/1927 | Schlegel . |
| 1,692,913 | 11/1928 | Whiting . |
| 1,887,341 | 11/1932 | Venable . |
| 3,464,348 | 9/1969 | McGlinchey . |
| 3,586,093 | 6/1971 | Young . |
| 3,855,917 | 12/1974 | Farrell et al. . |
| 4,005,971 | 2/1977 | Knudsen . |
| 4,017,230 | 4/1977 | Jakel . |
| 4,108,610 | 8/1978 | Leibrock . |
| 4,755,253 | 7/1988 | Ciolkevich . |
| 4,948,358 | 8/1990 | Kushibe et al. . |

FOREIGN PATENT DOCUMENTS 0903114 2/1982 U.S.S.R. .............................. 425/356
977181 12/1982 U.S.S.R. .

*Primary Examiner*—Charles S. Bushey
*Attorney, Agent, or Firm*—Barnes & Thornburg

[57] ABSTRACT

An apparatus is provided for compressing a material in a mold. The apparatus includes a frame having a first portion and a second portion. The apparatus also includes a roller coupled to the first portion of the frame for compressing the material in the mold, and a support plate coupled to the second portion of the frame for receiving the mold thereon to position the mold relative to the compression roller. The apparatus further includes an apparatus for varying the distance between the roller and the support plate so that the roller applies a compressive force to the material. A drive mechanism is coupled to the support plate for moving the support plate relative to the roller in a direction normal to the compressive force applied by the roller.

4 Claims, 5 Drawing Sheets

COMPACTING APPARATUS

This is a continuation of application Ser. No. 07/885,155 filed May 18, 1992, now U.S. Pat. No. 5,334,005.

BACKGROUND AND SUMMARY OF THE INVENTION

The present invention relates to an apparatus and method for compacting or compressing a material in a mold. More particularly, the present invention relates to an apparatus and method which simulates actual road building conditions for compacting an asphalt and aggregate mixture in a mold to form an asphalt and aggregate slab having a substantially uniform thickness and density.

The present invention is designed to form asphalt and aggregate slabs for testing purposes. These slabs are tested on wheel tracking machines or other test equipment to test the strength and durability of a particular asphalt and aggregate mixture. In addition, test specimens of other shapes can be cut from these slabs. These test specimens can then be tested on other test equipment. By testing various combinations of asphalt and aggregate, it is possible to select a mixture that will be more durable and last longer when the mixture is applied to a road.

Asphalt roads are formed by placing a layer of asphalt and aggregate mixture over the road surface to be covered. This mixture is then compacted with a roller. The roller compresses the mixture to a predetermined density and aligns the aggregate pieces in the mixture without breaking the aggregate. The compacted asphalt and aggregate mixture has a substantially uniform thickness and density.

It is desirable to produce asphalt and aggregate slabs for testing purposes which simulate the mixture after it has been applied to the road. In a previous method of forming asphalt slabs for testing, the asphalt and aggregate mixture is tamped or pounded in a mold to compress the mixture. However, the impact can crack or break the aggregate stones in the mixture. This results in a sample that is different than the actual road constructed with that mixture. Therefore, this previous pounding method does not simulate actual road mixture of asphalt and aggregate.

In another previous method of forming asphalt slabs for testing, the asphalt and aggregate mixture is compressed in a mold using a roller or wheel applied directly on the surface of the mixture. Using rollers typically avoids the problem of cracking and breaking the aggregate stones. However, the mixture compressed with the roller tends to well up in front of and behind the roller at each end of the mold making it difficult or impossible to form slabs having a uniform thickness and density. Therefore, the direct contact roller method is also ineffective for producing test slabs which simulate an actual road surface.

The present invention makes it possible to make asphalt slabs having a substantially uniform thickness and density in which the aggregate in the mixture is aligned and not cracked or broken. In other words, the present invention produces slabs substantially identical to slabs cut from an actual road surface.

According to one aspect of the present invention, an apparatus is provided for compressing a material in a mold. The apparatus includes a frame having a first portion and a second portion. The apparatus also includes means coupled to the first portion of the frame for compressing the material in the mold, and a support plate coupled to the second portion of the frame for receiving the mold thereon to position the mold relative to the compressing means. The apparatus further includes means for varying the distance between the compressing means and the support plate so that the compressing means applies a compressive force to the material, and drive means coupled to the support plate for moving the support plate relative to the compressing means in a direction normal to the compressive force applied by the compressing means.

Illustratively, the compressing means is a roller coupled to the first portion of the frame for applying a compressive force to the mold. It is understood that the drive means can be any means which provides relative movement between the compressing means and the support plate in a direction normal to the direction of the compressive force.

According to another aspect of the present invention, an apparatus is provided which includes a frame, a mold for receiving the material therein, and means for supporting the mold on the frame. A plurality of plates are inserted into the mold in a side by side relationship with an edge of each plate in contact with the material. The apparatus also includes means coupled to the frame for applying a compressive force against the plurality of plates in the mold to compress the material.

According to yet another aspect of the present invention, a method is provided for compressing a material. The method includes the steps of placing the material in a mold, placing a plurality of plates in the mold in a side by side relationship over the material with an edge of each plate in contact with the material so that said plates substantially cover the material, and applying pressure against the plates so that the plates compress the material located in the mold. The method also includes the step of adjusting the distance between the mold and the pressure applying means as the material is compressed, and the step of providing relative movement between the mold and the pressure applying means in a direction normal to a compression force applied by the pressure applying means.

Additional objects, features, and advantages the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 2:
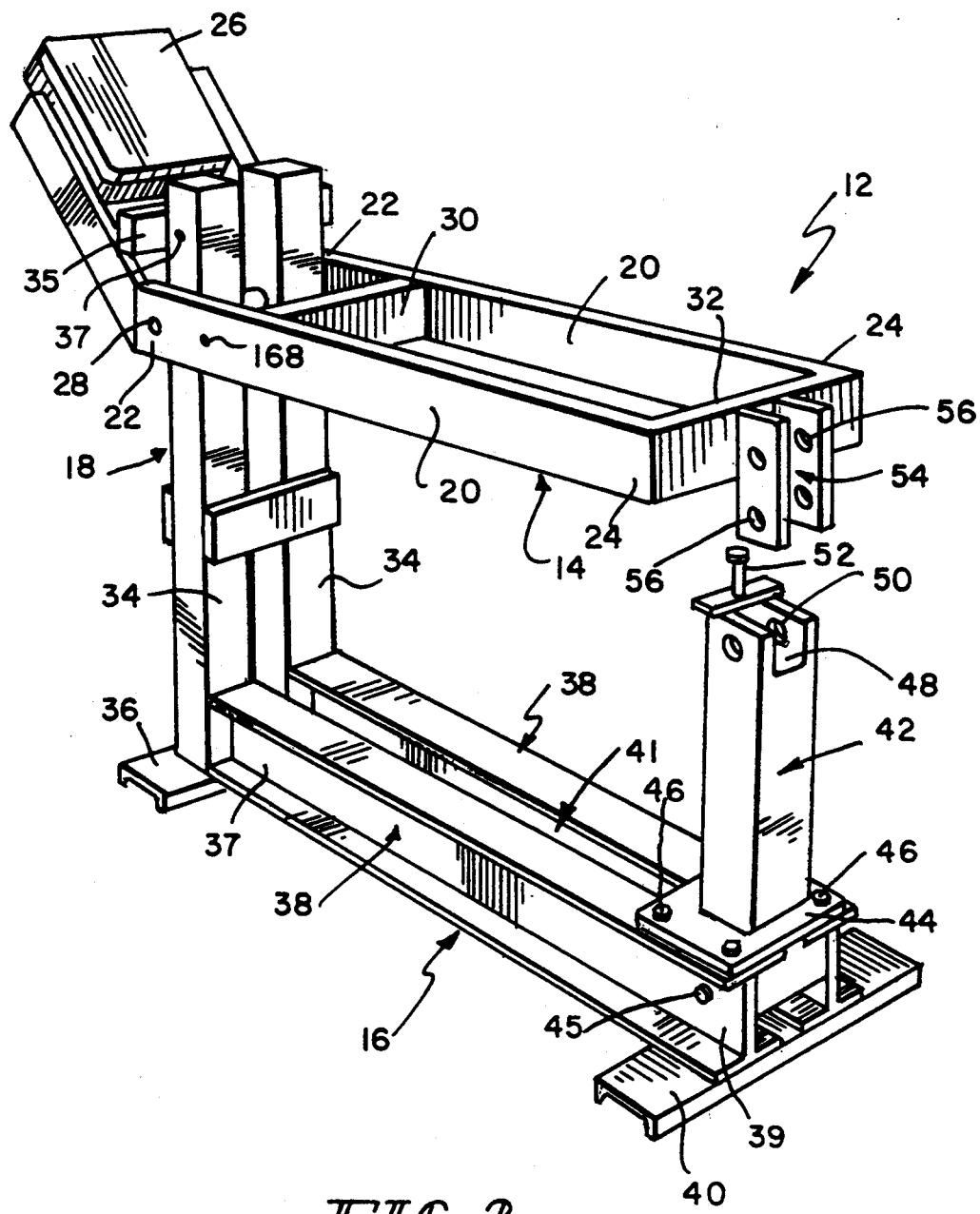
FIG. 2 is a perspective view illustrating the frame of the FIG. 1 embodiment.

Referring now to the drawings, a compacting or compressing assembly 10 includes a frame assembly 12 having a first pivotable portion 14, a second generally horizontal portion 16, and a generally vertical portion 18. The configuration of the frame assembly 12 is best illustrated in FIG. 2. The first portion 14 of frame 12 includes a pair of spaced-apart, parallel beams 20. Each beam 20 includes a proximal end portion 22 and a distal end portion 24. A counterweight 26 is coupled to the proximal ends 22 of beams 20. Counterweight 26 is positioned at an upwardly extending angle relative to a longitudinal axis through beams 20. Beams 20 of first portion 14 of frame 12 are pivotably coupled to the vertical portion 18 of frame 12 by pivot pin 28. A cross beam 30 is coupled between the parallel beams 20 at a location near proximal end 22 for reinforcement. A cross beam 32 is also coupled between the pair of parallel beams 20 at the distal end 24 of beams 20.

Vertical portion 18 includes a pair of parallel beams 34 coupled to a pair of parallel horizontal I-beams 38 which form horizontal portion 16 of frame 12. A cross beam 35 is coupled between the parallel beams 34 to provides a blocking member to limit the range of pivotal movement of first portion 14 of frame 12 relative to vertical portion 18 by engaging beams 20 of the first portion 14. One end of each horizontal I-beam 38 is coupled to a first support pad 36. An opposite end 39 of each horizontal I-beam 38 is coupled to a second support pad 40. An opening 41 is formed between the pair of I-beams 38. A second vertical member 42 is coupled to the ends 39 of horizontal beams 38 by a plate 44 having a clevis (not shown) attached thereto and a pin 45 which extends through beams 38 and through the clevis (not shown). Adjusters 46 coupled to plate 44 engage beams 38 to adjust the tension of the clevis (not shown) against the pin 45. It is understood that the vertical member 42 could be bolted directly to the beams 38. Vertical member 42 includes a notched portion 48 and apertures 50. A mechanical stop 52 is coupled to vertical member 42. A bracket 54 is coupled to the cross beam 32 of first portion 14 of frame 12. Bracket 54 is formed to include two pairs of apertures 56.

Referring again to FIG. 1, a roller 60 is rotatably coupled between the two parallel beams 20 of the first portion 14 of frame 12. Opposite ends of roller 60 are coupled to a respective beam 20 by a bearing member 62. A threaded bar or threaded member 64 is coupled at one end to a bearing 66 which permits rotation of threaded member 64 relative to bearing 66. Bearing 66 is coupled to vertical post 42 by a pin 68 extending through apertures 50. Threaded member 64 pivots about pivot pin 68 to the dotted position illustrated in FIG. 1. When the threaded member 64 is in the dotted position, a threaded block 70 on threaded member 64 is disengaged from bracket 54 on the first portion 14 of frame 12. This permits the first portion 14 of frame 12 to pivot relative to the vertical member 18 so that the counterweight 26 and the first portion 14 of frame 12 move to the dotted position illustrated in FIG. 1. Such movement permits a mold 72 to be loaded onto a support plate 74 discussed in detail below.

Figure 1:
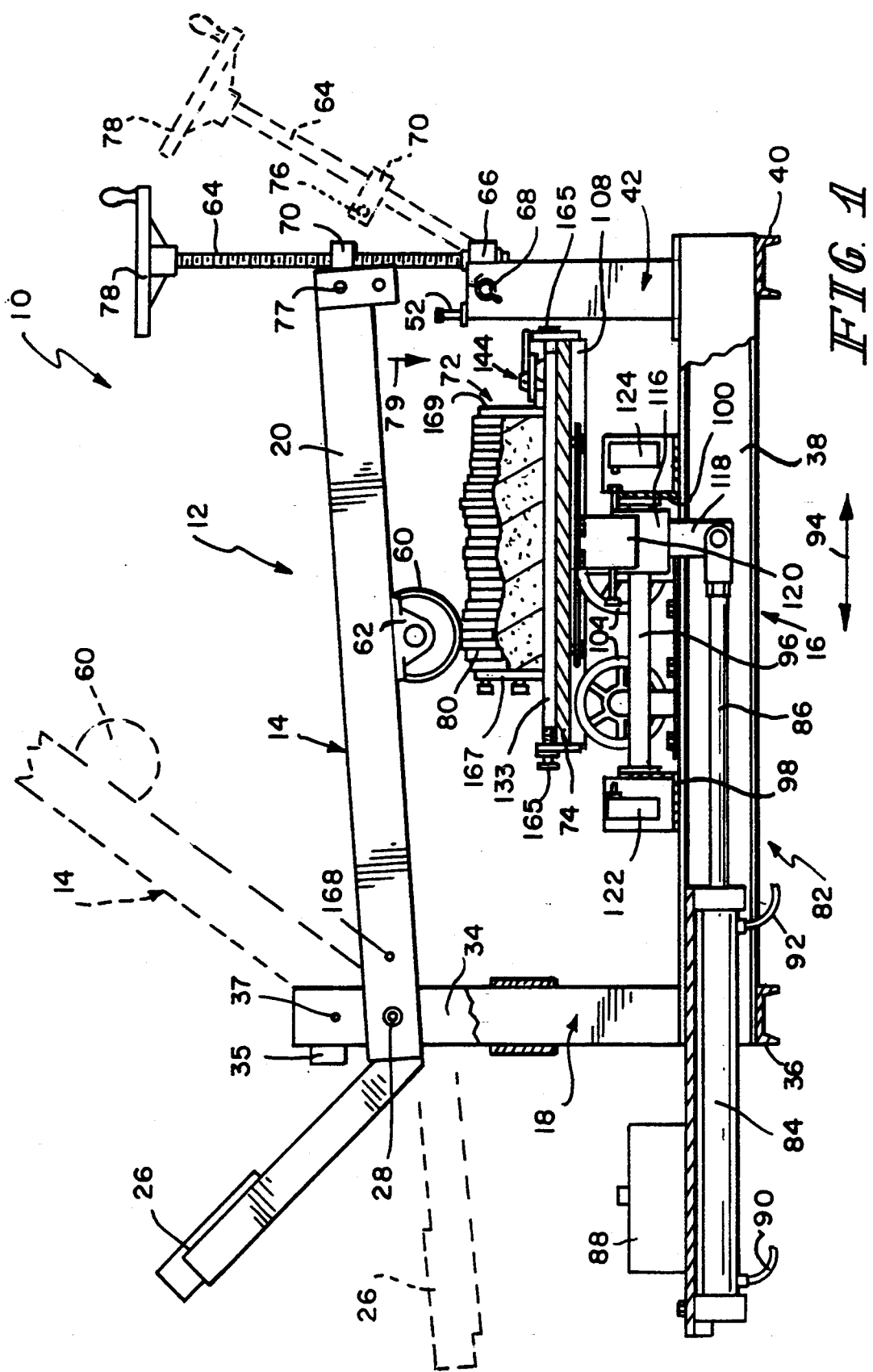
FIG. 1 is a sectional view taken through preferred embodiment of a compacting apparatus of the present invention.

After mold 72 is loaded on support plate 74, first portion 14 of frame 12 is pivoted to the position illustrated in FIG. 1. Threaded block 70 is then rotated relative to threaded member 64 until the threaded block 70 is aligned with one set of apertures 56 in bracket 54. In FIG. 1, threaded block 70 is coupled to bracket 54 using the top set of apertures 56. A pin member 77 is inserted through apertures 54 and through an aperture 76 in threaded block 70 to couple the threaded block 70 to the bracket 54. A wheel 78 is coupled to a top end of threaded member 64 for rotating threaded member 64 relative to frame 12. Rotation of threaded member 64 causes first portion 14 of frame 12 to move downwardly in direction of arrow 79 so that roller 60 provides a compressive force against a plurality of plates 80 situated in mold 72 as discussed in detail below. The compressive force is applied by the roller in the direction of arrow 79. Threaded member 64, threaded block 70, bracket 54 and vertical post 42 provide means for varying the distance between roller 60 and support plate 74. It is understood that other means could be used for this purpose including a turnbuckle, a cylinder and piston arrangement, or other equivalent structure. The distance varying means may be controlled by a computer to move the roller 60 incrementally closer to the support plate 74 during compression of the mixture.

Drive means 82 is provided for moving the support plate 74 back and forth relative to roller 60 along a predetermined path. The drive means 82 includes a cylinder 84 and piston 86 assembly. Preferably, cylinder 84 is a hydraulic cylinder. However, it is understood that an air cylinder, rack and pinion, screw, belt, linear actuator or other equivalent mechanism may be used in place of cylinder 84. A control system 88 controls movement of the piston 86 within cylinder 84 using a three-way valve (not shown). Control system 88 controls flow of hydraulic fluid to and from lines 90 and 92 on opposite sides of a piston head (not shown) located inside cylinder 84. Flow of fluid into and out of cylinder 84 controls movement of the piston 86 back and forth in the direction of double-headed arrow 94.

Figure 3:
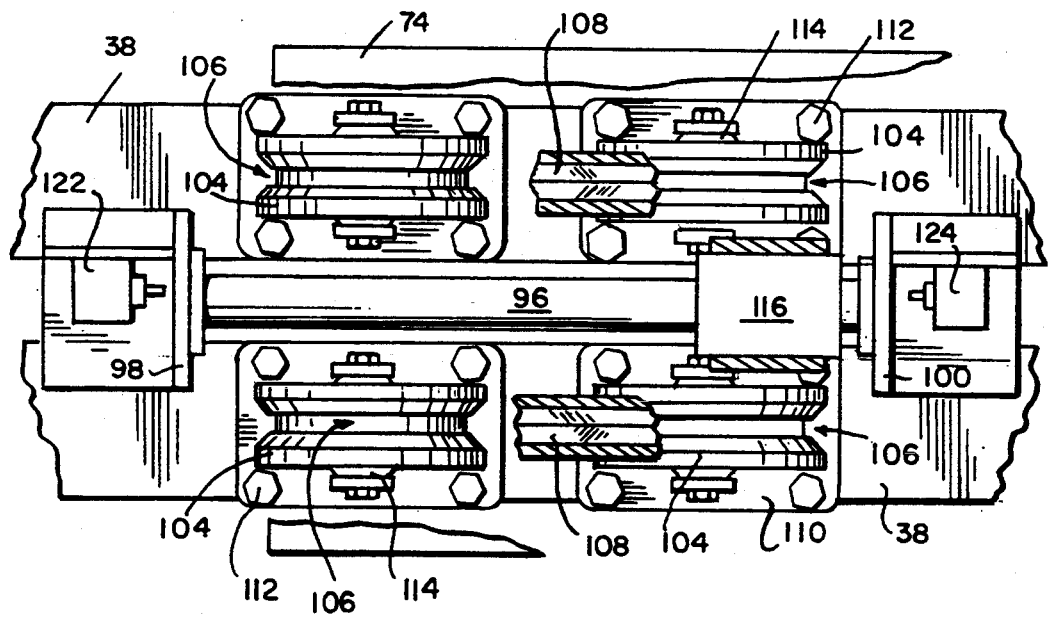
FIG. 3 is a partial sectional view with portions broken away illustrating one embodiment of the drive mechanism.

Drive means 82 also includes a guide bar 96 coupled between first and second brackets 98 and 100 and two pairs of rollers 104 coupled to the second portion 16 of frame 12 on the opposite sides of guide bar 96. Brackets 98 and 100 are coupled to beams 38 of the second portion 16 of frame 12. As best illustrated in FIG. 3, two rollers 104 are mounted to each of the beams. Each roller 104 is formed to include a V-shaped groove 106 therein for receiving V-shaped rails 108 coupled to a bottom surface of support plates 74. Rollers 104 are coupled to beams 38 by mounting brackets 110 and suitable fasteners 112. Mounting brackets 110 include bearing members 114 which permit rotation of rollers 104. A sleeve or bracket 116 is slidably coupled to guide bar 96. An end of piston rod 86 is coupled to the sliding bracket 116 by a lower bracket 118 which extends through opening 41. Sliding bracket 116 is also coupled to support plate 74 by an upper bracket 120. First and second limit switches 122 and 124 are coupled to the first and second brackets 98 and 100, respectively.

Movement of the piston 86 back and forth in the direction of double-headed arrow 94 in FIG. 1 causes support plate 74 to move back and forth along a predetermined path defined by the guide bar 96. Therefore, movement of support plate 74 and mold 72 is in direction normal to the direction of the compressive force from roller 60.

Figure 4:
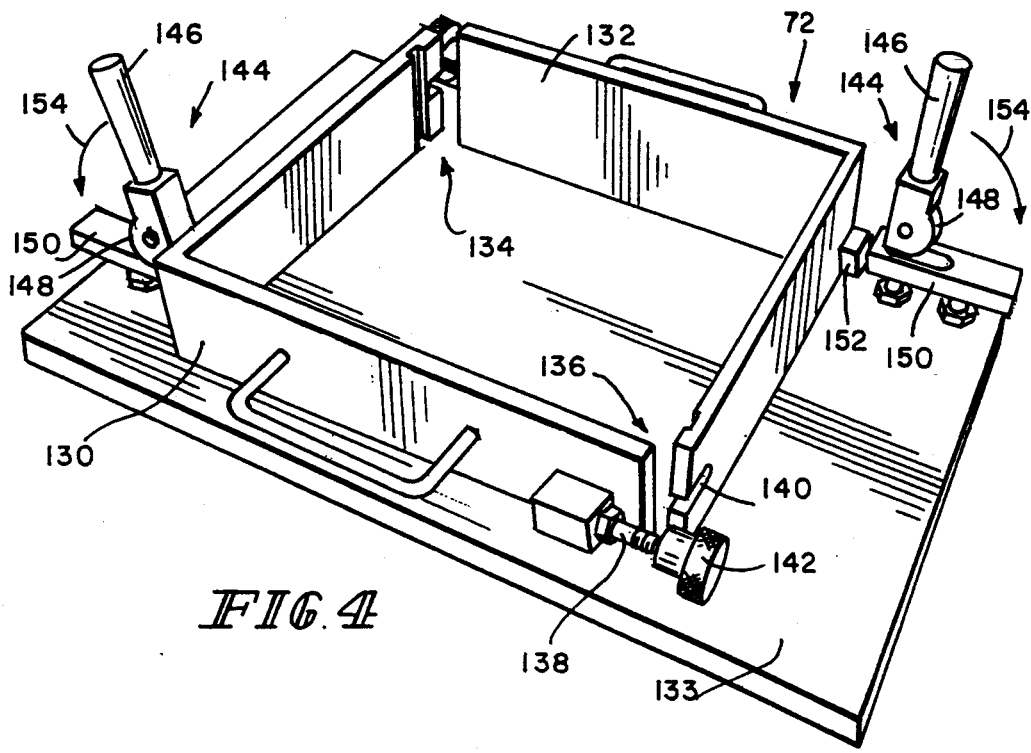
FIG. 4 a perspective view illustrating a disassembled mold assembly for use with the compacting apparatus of FIG. 1.

In operation, the present invention is designed to form an asphalt and aggregate slab which simulates a sample cut from an actual road surface in a conventional manner. A sample portion of asphalt and aggregate mixture is first placed in mold 72. One such mold is illustrated in FIG. 4. Mold 72 includes a first L-shaped portion 130 and a second L-shaped portion 132. The mold is assembled directly on a base plate 133. Opposite corners 134 and 136 of mold 72 are formed by coupling the free ends of L-shaped members 130 and 132 together. A threaded bar 138 on one member 130 or 132 slides into a slot 140 on the opposite member 132 or 130. A threaded knob is then rotated to couple the ends of L-shaped members 130 and 132 together rigidly. Mold 72 is then coupled to base plate 133 using locking means 144 located at opposite ends of base plate 133. Locking means 144 includes a handle 146, a cam surface 148, and a compression plate 150. A locking block 152 is coupled to each of the L-shaped mold members 130 and 132. The blocks 152 of mold 72 slide under compression plates 150 when handles 146 are in the upright position illustrated in FIG. 4. After the blocks 152 are under compression plates 150, handles 146 are pivoted in the direction of arrows 154. Cam surface 148 of locking means 144 forces the compression surface 150 downwardly against the blocks 152 to lock the mold 72 in place on base plate 133.

Figure 5:
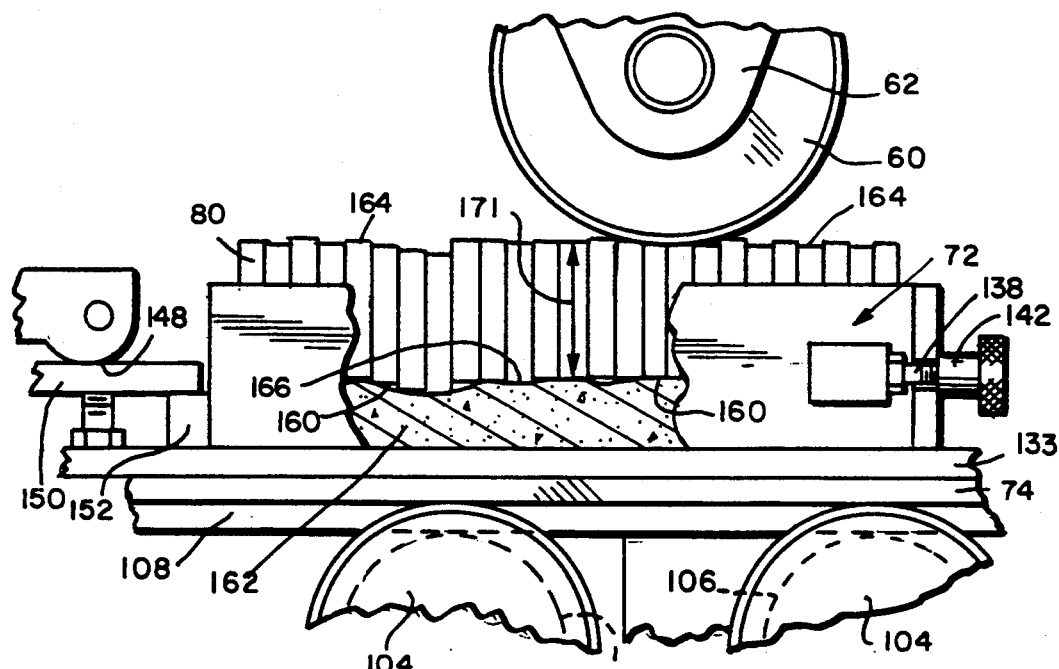
FIG. 5 is a partial side elevational view with portions broken away illustrating the configuration of a plurality of plates situated in the mold having an edge in contact with the material and a roller in contact with an opposite edge of the plates.
Figure 6:
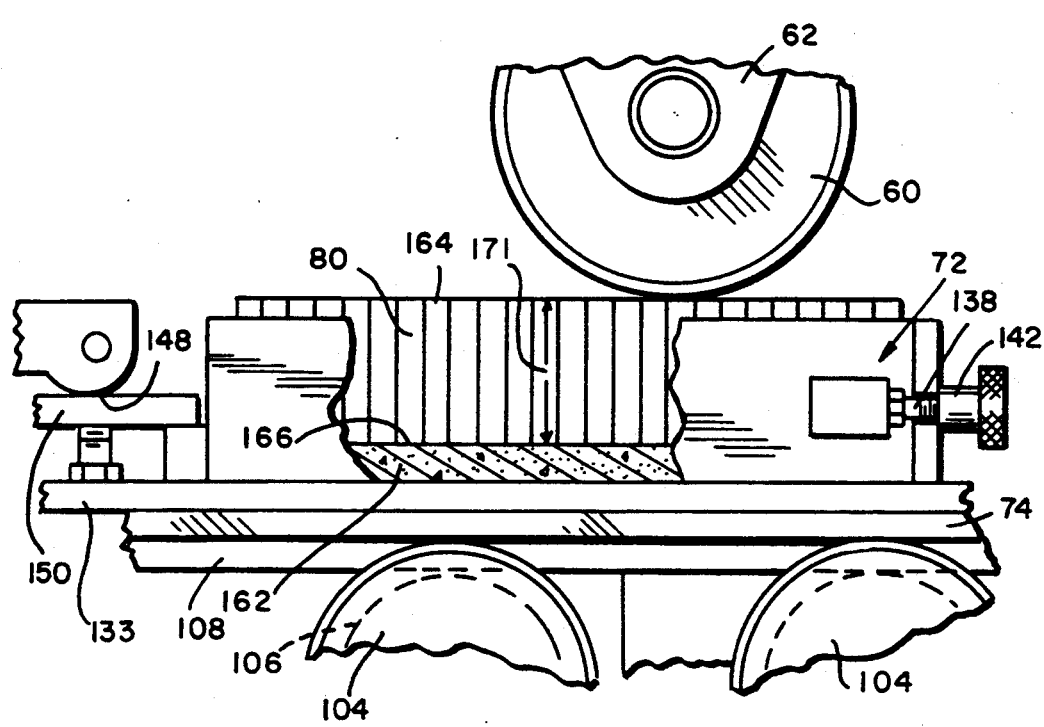
FIG. 6 is a partial side elevational view similar to FIG. 5, after the material has been compressed to form a uniform slab in the mold.

A predetermined quantity of the asphalt and aggregate mixture 162 is then placed in mold 72. A plurality of plates 80 are then stacked in the mold in a side-by-side relationship over the mixture 162. Mold 72 and plates 80 may be heated to keep the asphalt and aggregate mixture 162 hot during compacting. The plates 80 are sized so that they slide into mold 72 abutting opposite side walls of mold 72. As illustrated in FIGS. 5 and 6, bottom edges 160 of plates 80 contact the asphalt and aggregate mixture 162 located within mold 72. A top edge 164 of plates 80 is engaged by roller 60. Preferably, each of the plates 80 will have substantially equal height and width dimensions. Therefore, the plates 80 fit in mold 72 and compress the mixture 162. However, the thickness of the plates can be varied as necessary to fill mold 72 with plates 80.

When the asphalt and aggregate mixture 162 is placed within mold 72, an upper surface contour 166 of the mixture is uneven. When the mixture is put down on an actual highway, a roller is used to compress the mixture to a predetermined density. The roller aligns the stone or aggregate in the mixture and does not crack the aggregate.

As illustrated in FIGS. 1 and 5, the plates 80 extend different distances above the mold 72 when first inserted into the mold 72 over the uneven mixture surface 166. The mold 72 and the plates 80 are loaded onto the support plate 74 of apparatus 10 by pivoting the first portion 14 of frame 12 to the dotted position illustrated in FIG. 1. Set screws 165 on support plate 74 engage base plate 133 of mold 72 to hold mold 72 on support plate 74. Counterweight 26 facilitates the pivotable movement of first portion 14 of frame 12. A removable pin 168 is located in an aperture formed in the first portion 14 of frame 12 to hold the first portion 14 of frame 12 in the elevated position illustrated by the dotted lines in FIG. 1 while the support plate 74 and mold 72 are coupled to the apparatus. Pin 168 can inserted into an aperture 37 in beam 34 to lock first portion 14 of frame 12 relative to vertical portion 18. The support plate 74 is coupled to the sliding bracket 116 of drive means 82 by upper bracket 120. First portion 14 of frame 12 is then lowered to the position illustrated in FIG. 1 in which roller 60 engages the upper surface 164 of plate 80 which extends the greatest distance above mold 72. Threaded member 64 is then pivoted from its dotted position to its locked position and threaded block 70 is coupled to bracket 54 on first portion 14 of frame 12.

The drive means 82 is then actuated to begin movement the support plate 74 and mold 72 back and forth relative to the roller 60 in the direction of double-headed arrow 94. The control system 88 controls flow of hydraulic fluid into lines 90 and 92 to move a piston member 86 back and forth in the directions illustrated by double-arrow 94. Limit switches 122 and 124 send electrical signals to the control system 88 to control movement of the support plate 74. Cylinder 84 moves the support plate 74 at a constant speed in both directions. Movement of support plate 74 back and forth over rollers 104 causes roller 60 to roll over each of the plates 80 located in mold 72. Movement of mold 72 and support plate 74 is in a direction normal to the direction of the compressive force applied by roller 60. The support plate 74 moves from a first position in which roller 60 is positioned directly above the plate 80 adjacent a first end wall 167 of mold 72 to a second position in which roller 60 is positioned directly above the plate 80 adjacent to a second end wall 169 of mold 72.

Plates 80 transfer the compressive force from roller 60 to the top surface 166 of mixture 162. As the support plate 74 moves back and forth, the wheel 78 is rotated to move threaded member 64 relative to the fixed threaded block 70 so that the first portion 14 of frame 12 moves downward in the direction of arrow 79. This causes the compressive force of roller 60 to be maintained as the mixture 162 is compressed. The support plate 74 is repeatedly moved back and forth so that all the plates 80 pass beneath roller 60. Wheel 78 is incrementally rotated until the roller 60 has compressed the mixture 162 to a predetermined density. FIG. 5 illustrates operation of the apparatus after several reciprocating movements of support plate 74. The plates 80 begin to compress the mixture evenly so that each of the plates 80 are at the same level. As illustrated in FIG. 6, after the mixture 162 is compressed to a substantially uniform density and thickness, the vertical plates 80 are aligned so that the top edge 164 of plates 80 are located substantially the same distance above mold 72. Therefore, it is critical that each of the plates 80 has an equal height illustrated by dimension 171 in FIGS. 5 and 6. By knowing the amount of mixture 162 inserted into mold 72, and by knowing the height of the plates 80, it is possible to determine when the mixture 162 has been compressed to a particular density by the distance that plates 80 extend above mold 72. Mechanical stop 52 provides a positive stop which helps to produce more consistent samples. Stop 52 engages first portion 14 of frame 12 to block movement of the first portion 14 beyond the stop 52. After the mixture 162 is compressed to the predetermined density as illustrated in FIG. 6, the mixture is allowed to cool and harden. The plates 80 are then removed from the mold 72. The mold 72 is then separated to remove the slab 162 from the mold 72.

Figure 7:
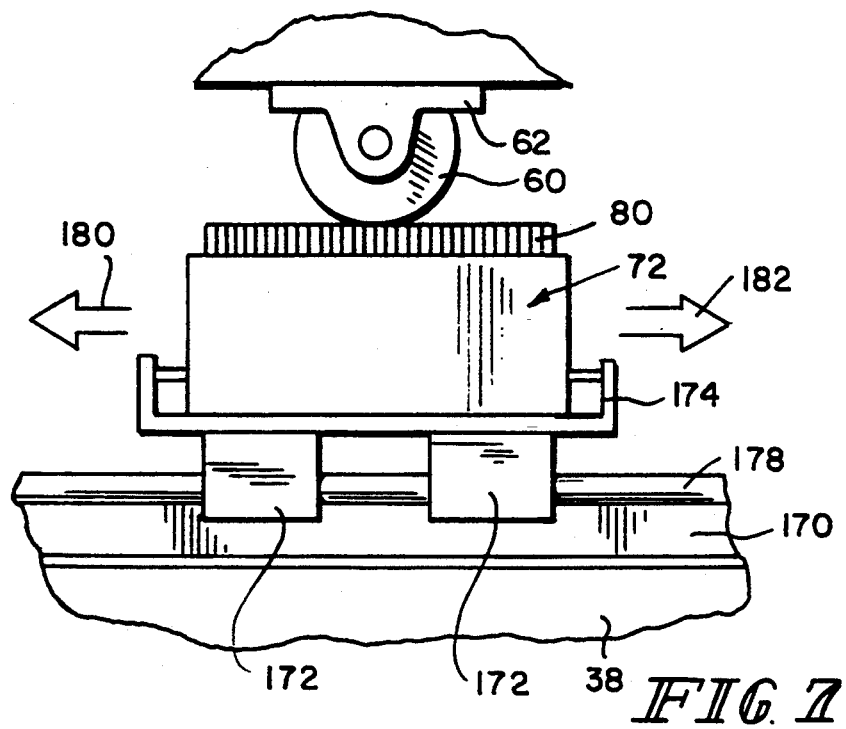
FIG. 7 is a side elevational view of another embodiment of the present invention which includes a slide mechanism.
Figure 8:
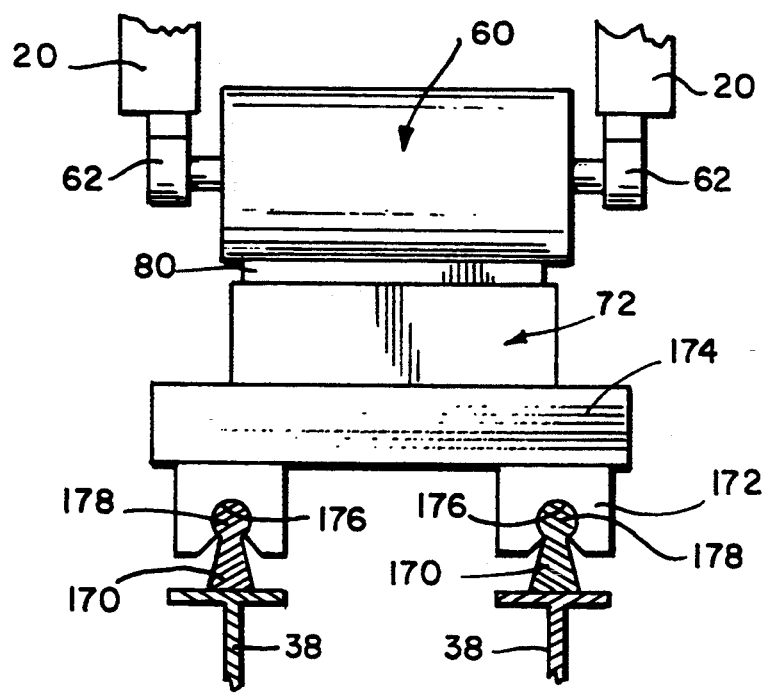
FIG. 8 is a sectional view taken through the embodiment of FIG. 7.

FIGS. 7 and 8 illustrated an alternative embodiment of the guide mechanism for drive means 82 which includes a pair of rails 170 coupled to the beams 38 of frame 12. A pair of linear bearings 172 are coupled to each side of support plate 174. The linear bearings 172 include a generally circular track 176 which receives rounded heads 178 of rails 170 therein. The support plate 174 is moved back and forth in the direction of arrows 180 and 182 illustrated in FIG. 7 by the cylinder arrangement of FIG. 1 which is not shown in FIGS. 7 and 8, for clarity.

The distance varying means of the present invention is illustrated in the preferred embodiment as moving the first portion 14 of frame 12 along with roller 60 downwardly relative to support plate 74 in the direction of arrow 79. In addition, the drive means 82 of the present invention is illustrated in the preferred embodiment as moving support plate 74 back and forth along the predetermined path in directions illustrated by double-headed arrow 94. It is understood that other methods could be used for providing relative movement between the roller 60 and the support plate 74. In another embodiment, the roller 60 could be moved downwardly toward support plate 74 and also reciprocated back and forth over the support plate 74 in the directions illustrated by double-headed arrow 94. In this embodiment, the support plate 74 would be stationary throughout the compressing process. In a third embodiment, the roller 60 could be stationary throughout the compressing process. The support plate 74 could be lifted upwardly toward roller 60 and reciprocated back and forth beneath roller 60 in the directions illustrated by double-headed arrow 94 to compress the mixture 162 in the mold 72. In a fourth embodiment, the roller 60 could be reciprocated back and forth in the directions of double-headed arrow 94 and the support plate 74 and mold 72 could be incrementally moved upwardly toward roller 60 as the material 162 is being compressed in mold 72.

Although the invention has been described in detail with reference to certain preferred embodiments, variations and modifications exist within the scope and spirit of the invention as described and defined in the following claims.

What is claimed is:

1. An apparatus for compressing a material in a mold, the apparatus comprising:
   a frame;
   a support plate coupled to the frame for mounting the mold thereon;
   means for coupling the support plate in a fixed vertical position relative to the frame to permit reciprocating movement of the support plate only in a horizontal direction relative to the frame along a predetermined path;
   a roller rotatably coupled to the frame above the support plate for compressing the material in the mold;
   means for moving the support plate in the horizontal direction relative to the frame along the predetermined path so that the support plate passes back and forth below the roller; and
   means for moving the roller vertically downward relative to the frame and the support plate to adjust the compressive force applied to the material by the roller incrementally during reciprocating horizontal movement of the support plate.

2. The apparatus of claim 1, further comprising a plurality of vertical plates located in the mold above the material to compress the material.

3. The apparatus of claim 2, wherein each of the vertical plates has a substantially equal width dimension and a substantially equal height dimension.

4. The apparatus of claim 1, wherein the means for coupling the support plate to the frame includes a pair rails coupled to the frame and a pair of linear bearings coupled to the support plate for engaging the rails so that the support plate can slide back and forth along the predetermined path on the rails.

* * * * *